US006908249B2

(12) United States Patent
Tomm

(10) Patent No.: US 6,908,249 B2
(45) Date of Patent: Jun. 21, 2005

(54) LEVER-ACTIVATED LOCK FOR TELESCOPING POLE

(76) Inventor: Erwin Tomm, 3320 W. 130th St., Cleveland, OH (US) 44111

(*) Notice: Subject to any disclaimer, the term of this patent is extended or adjusted under 35 U.S.C. 154(b) by 0 days.

(21) Appl. No.: 09/975,348

(22) Filed: Oct. 11, 2001

(65) Prior Publication Data

US 2002/0081146 A1 Jun. 27, 2002

Related U.S. Application Data

(60) Provisional application No. 60/258,433, filed on Dec. 27, 2000.

(51) Int. Cl.[7] .................................................. F16B 7/10
(52) U.S. Cl. ............................ 403/109.1; 403/374.5; 403/377; 403/322.4
(58) Field of Search ............................ 403/322.4, 373, 403/374.3, 374.5, 377, 396, DIG. 4, 33, 109.1, 290, 321, 322.1, 322.3, 338, 379.3, FOR 100; 411/399, 1, 6, 8, 339

(56) References Cited

U.S. PATENT DOCUMENTS

| 3,682,508 | A | * | 8/1972 | Briles ...................... 411/399 X |
| 4,111,575 | A | * | 9/1978 | Hoshino .................. 403/377 X |
| 4,234,309 | A | * | 11/1980 | Sellers |
| 4,575,063 | A | | 3/1986 | Schlegel et al. |
| 4,596,484 | A | * | 6/1986 | Nakatani ................ 403/377 X |
| 4,744,690 | A | | 5/1988 | Hsieh |
| 4,761,092 | A | * | 8/1988 | Nakatani ............. 403/374.5 X |
| 5,022,672 | A | * | 6/1991 | Kawai |
| 5,324,150 | A | * | 6/1994 | Fullerton |
| 5,664,904 | A | * | 9/1997 | Hapgood et al. ........ 403/396 X |
| 5,775,352 | A | * | 7/1998 | Obitts .................. 403/109.1 X |
| 5,813,258 | A | * | 9/1998 | Cova et al. |
| 5,918,997 | A | * | 7/1999 | Hsieh ..................... 403/110 X |
| 6,155,743 | A | * | 12/2000 | Chen ...................... 403/374.1 |

FOREIGN PATENT DOCUMENTS

| EP | 1 039 149 A1 | 9/2000 |
| NL | 7 601 311 A | 8/1977 |
| NL | 7601311 | 8/1977 |

OTHER PUBLICATIONS

Inetrnational Search Report dated Apr. 29, 2002 from International Application No. PCT/US 01/49658 filed Dec. 26, 2001, (corresponding to this application).

* cited by examiner

Primary Examiner—Daniel P. Stodola
Assistant Examiner—Ryan M. Flandro
(74) Attorney, Agent, or Firm—Fay, Sharpe, Fagan, Minnich & McKee, LLP

(57) ABSTRACT

A lock for securing first and second telescoped pole sections includes a base defining a through-bore for receipt of an end of a first pole section. A neck projects from the base and a collar is connected to the neck. The collar defines an opening aligned with the bore of the base. The collar receives a second pole section that is telescoped into the first pole section. A fastener is connected to the collar and a threaded end thereof projects from the collar. A lever control member is mated with the threaded end of the fastener and is movable to selectively radially constrict the collar. The fastener is rotatable relative to the collar but is frictionally engaged with the collar to prevent its unintended rotation. As necessary, the fastener is rotated relative to the collar to adjust the amount that the lever is advanced thereon.

14 Claims, 2 Drawing Sheets

LEVER-ACTIVATED LOCK FOR TELESCOPING POLE

CROSS-REFERENCE TO RELATED APPLICATION

This application claims priority from and hereby expressly incorporates by reference U.S. provisional application No. 60/258,433 filed Dec. 27, 2000.

BACKGROUND OF THE INVENTION

The present invention relates to a lock for selectively fixedly securing sections of a telescoping pole relative to each other to prevent telescoping movement or rotational movement therebetween. The subject lock is similar to conventional locks of the same type, but includes a novel and unobvious lever-activated locking mechanism that is conveniently and infinitely adjustable. Conventional locks of this type are known to become overtightened and freeze in position so that they are difficult to loosen, or to loosen through use. Also, the torque needed to lock and unlock the mechanism on most conventional telescoping locks is very great, especially during unlocking. This high torque is detrimental to the user's body including his/her hands, wrists and associated ligaments, joints, etc. Often, these conventional locks become so set in the locked position that a tool (e.g., pliers or the like) must be used to unlock the device. These prior devices also sometimes are difficult to use in that it is not clear to the user which way the locking mechanism is to be turned for locking or unlocking. Thus, a need has been identified for a new and improved lock for a telescoping pole.

SUMMARY OF THE INVENTION

In accordance with the present invention, a lock is provided for temporarily fixedly securing first and second associated pole sections in a telescoped arrangement. The lock includes a base defining an axially extending through-bore adapted for close sliding receipt of an end portion of a first associated pole section. A neck projects from the base. A collar defines an opening aligned with the axially extending through-bore of the base. The collar is connected to the neck and is adapted for close sliding receipt of a second associated pole section partially telescoped into said first associated pole section. The collar is defined by first and second collar portions connected to the neck and terminating in respective first and second ears arranged in spaced-apart relation to each other. The ears define respective first and second bores. A fastener extends through the first and second bores between the first and second ears. The fastener includes: (I) a head abutting the first ear; (ii) a first portion frictionally engaged with a portion of the first ear that defines the first bore to inhibit unintentional rotation of the fastener; and, (iii) a threaded distal end extending through the second bore defined in the second ear and projecting outwardly from the second ear. A lever has a head defining a threaded aperture that is threadably engaged with the threaded distal end of the fastener. The lever is movable rotatably relative to the threaded distal end of the fastener between an unlocked position, wherein said collar slidably receives and accommodates a second associated pole section, and a locked position, wherein the head of said lever is advanced on the threaded distal end of the fastener toward the head of the fastener and urges the second ear toward the first ear to constrict the collar radially into frictional gripping engagement with a second associated pole section received in the collar.

In accordance with another aspect of the present invention, a telescoping pole apparatus is provided and includes a first pole section defining a first bore and a second pole section slidably located in the first bore of the first pole section in a telescoping arrangement. A lock is connected to the first pole section and is adapted to secure the second pole section axially relative to the first pole section. The lock, itself, includes a base defining an axial through-bore, wherein an end portion of the first pole section is located in the axial through-bore. A selectively radially constrictable and expandable collar is connected to the base and defines an opening aligned with the axial through-bore. The second pole section projects from the first bore of said first pole section and through the opening of the collar. The collar, when radially constricted, firmly engages and retains the second pole section in an axially and rotatably fixed position relative to the first pole section. A fastener is connected to the collar and is frictionally engaged with the collar so as to be restrained against unintended rotation relative to the collar. The fastener includes a threaded end that projects outwardly from the collar. A control member is provided and mates threadably with the threaded end of the fastener. The control member is selectively manually rotatable relative to the fastener in first and second directions to constrict and expand the collar radially, respectively.

In accordance with a further aspect of the present invention, a lock apparatus for fixedly securing first and second telescoping pole sections relative to each other is provided. The lock apparatus includes a first portion adapted for connection to an end portion of a first associated pole section. The lock further includes a second portion connected to the first portion and defining a selectively constrictable collar adapted for receipt of a second associated pole section that is partially telescoped into the first associated pole section. The collar, when radially constricted, firmly engages and fixedly retains a second associated pole section received thereby. A screw is connected to the collar and includes a headed end and an opposite threaded end. A lever is operably coupled to the threaded end of the screw and is adapted for rotation in a first direction on the screw causing the lever to be advanced on the screw toward the headed end whereby the collar is radially constricted. The lever is also adapted for rotation in a second direction, opposite the first direction, whereby the lever moves away from the headed end of the screw and the collar resiliently radially expands.

One advantage of the present invention is the provision of a novel and unobvious lever-activated lock for a telescoping pole.

Another advantage of the present invention resides in the provision of a lock for a telescoping pole that includes a lever control member that is easily manipulated by a user.

A further advantage of the present invention is found in the provision of a lock for a telescoping pole wherein that lock is manually adjustable using a conventional screwdriver.

Still another advantage of the present invention is that user over-tightening is inhibited.

A further advantage of the present invention is that it includes a minimum number of parts that simplify and reduce the cost of manufacturing.

A still further advantage of the present invention resides in the provision of a lever-activated lock for a telescoping pole that firmly and securing retains telescoping pole sections in an axially and rotatably fixed relationship relative to each other.

Still other benefits and advantages of the present invention will become apparent to those possessed of ordinary skill in the art to which the invention pertains upon reading and understanding this specification.

BRIEF DESCRIPTION OF THE DRAWINGS

The present invention comprises a variety of components and arrangements of components. A preferred embodiment of the invention is illustrated in the accompanying drawings that form a part hereof and wherein.

DETAILED DESCRIPTION OF PREFERRED EMBODIMENTS

Figure 1:
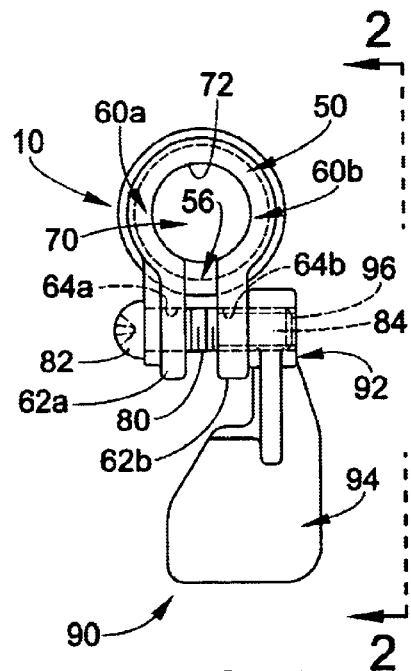
FIG. 1 is an end view of a lever-activated lock formed in accordance with the present invention.
Figure 2A:
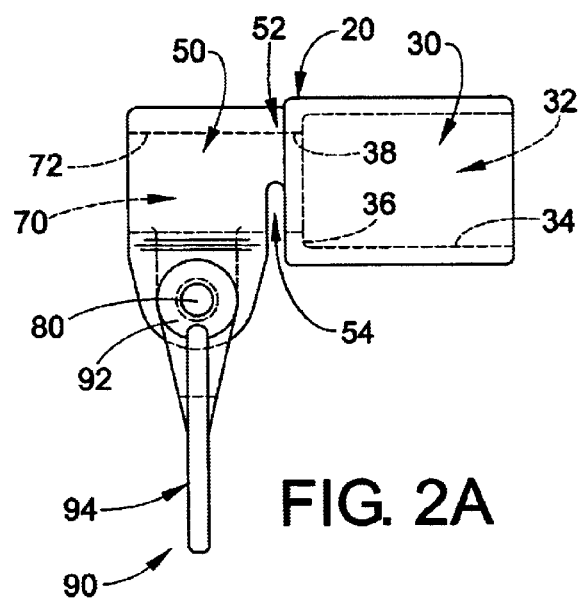
FIG. 2A is a side elevational view of a lever-activated lock formed in accordance with the present invention as taken along line 2—2 of FIG. 1.

Referring now to the drawings, a lever-activated lock formed in accordance with a preferred embodiment of the present invention is shown at 10. The lock comprises a body 20 having a base 30 and a collar 50. The body 20 is preferably defined as a one-piece molded plastic construction.

Figure 4:
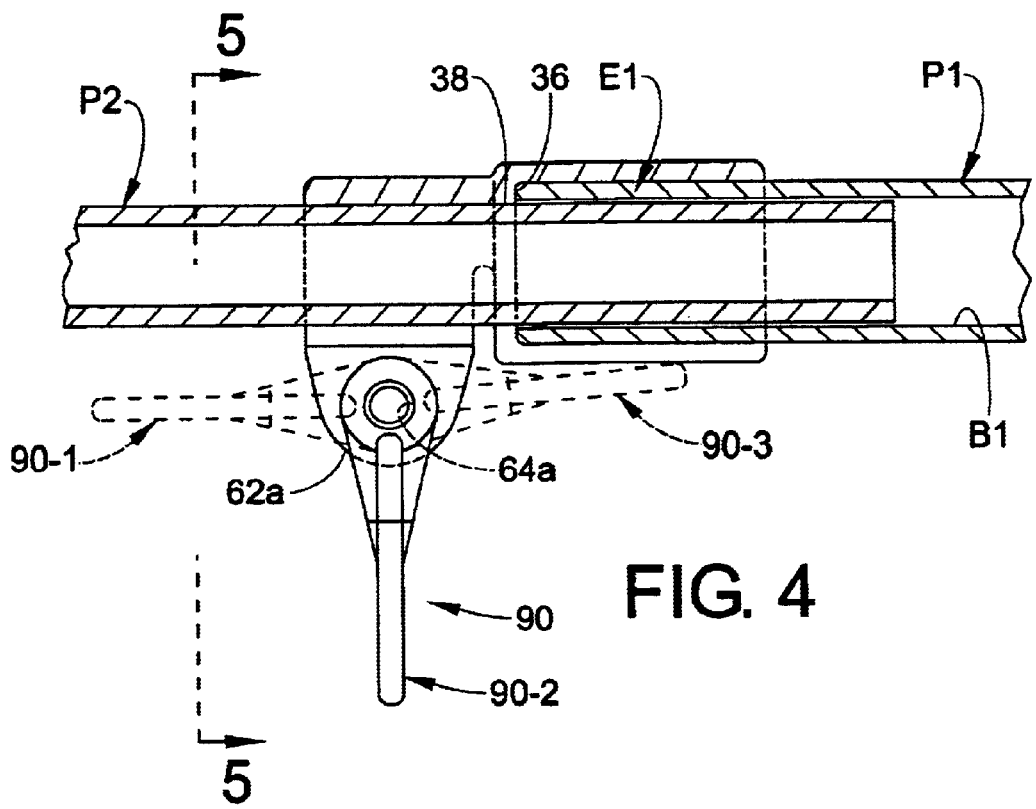
FIG. 4 is a view similar to FIG. 2, but showing the lever-activated lock body in section and showing associated pole sections upon which the lock operates; and, FIG. 5 is a view taken along line 5—5 of FIG. 4.

Telescoping poles are generally tubular members and, thus, the base 30 is preferably an annular member that defines an axial through-bore 32. The bore 32 includes a first, enlarged portion 34 that is dimensioned and conformed for close, sliding receipt of an end portion E1 of a first pole section P1 therein as shown in FIG. 4. The end E1 is preferably adhesively and/or mechanically secured in the enlarged portion 34 of the bore 32. A radially inwardly extending shoulder 36 is defined at the transition between the enlarged first portion 34 of the bore and the remaining second portion 38 of the bore 32. The shoulder 36 provides a stop for abutment of the pole section P1 thereagainst when the end E1 of the pole section is fully inserted into the enlarged bore portion 34 as shown in FIG. 4. Furthermore, with the base 30 operatively secured to the pole section P1 as shown in FIG. 4, the second portion 38 of the bore is aligned with the bore B1 formed through the pole section P1. The dimensions of the base 30 can vary, but one of ordinary skill in the art will recognize that it must have sufficient axial length to accommodate a sufficient length of the end E1 of the pole section P1 so that a strong connection between these two members is possible and so that the base 30 does not fracture under loads encountered for the expected application of the telescoping pole, e.g., window washing, light bulb changing, etc.

The collar 50 of the body 20 is connected to the base 30 by a narrow neck 52 so that a substantial portion of the collar 50 is separated from the base 30 by a space 54. This space 54 allows for radial constriction and expansion of the collar 50 relative to the base 30 as described below.

Figure 5:
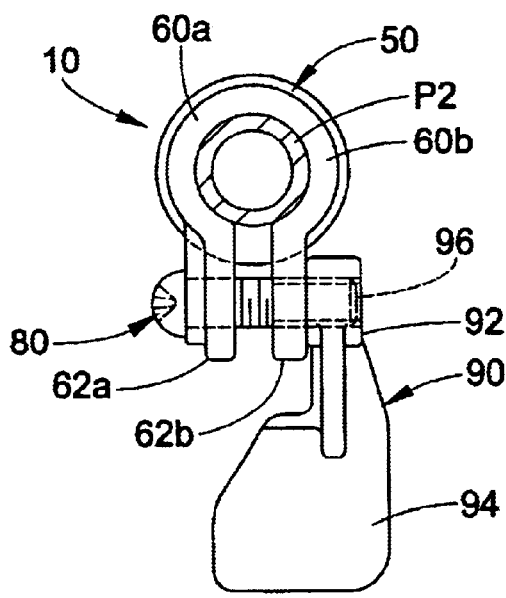

Referring to FIGS. 1 and 5, the collar 50 is also preferably conformed as an annular member, but it is split so that a circumferential gap 56 is defined between first and second collar halves 60a,60b. More particularly, each collar half 60a,60b originates at the neck 52 and terminates in an ear 62a,62b, respectively. The ears 62a,62b are arranged parallel and spaced-apart from each other. Movement of the ears 62a,62b together causes the collar 50 to constrict radially while movement of the ears 62a,62b away from each other causes radial enlargement of the collar 50.

The collar 50 also defines an opening or bore 70 therethrough that is coaxial with the bore 32 defined in the base 30. The opening 70 is dimensioned and conformed for close sliding receipt of a second pole section P2 (FIG. 4) therein when the collar halves 60a,60b are in a free, relaxed position, i.e., when the collar 50 is neither constricted nor enlarged. The collar 50 is defined to have an axial length that is sufficient to provide the collar with required strength and also so that the inner surface 72 defining the opening 70 contacts a sufficient axial length of the pole section P2 to grip same when the collar is constricted. As shown in FIG. 4, when the second pole section P2 is slidably inserted into the collar 50, the second pole section P2 telescopes through the base 30 and into the bore B1 of the first pole section P1.

Figure 3:
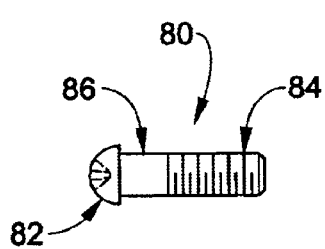
FIG. 3 illustrates a specialized screw that forms a part of the lever-activated lock of the present invention.
Figure 2B:
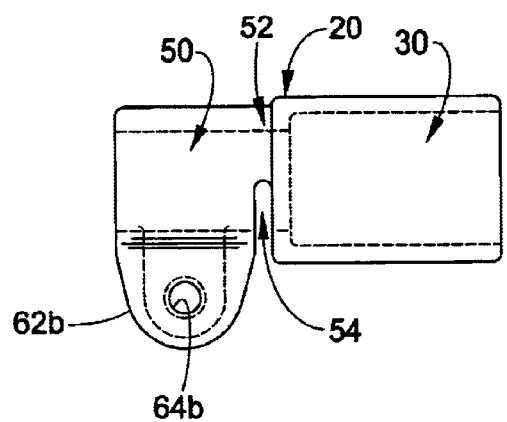
FIG. 2B is similar to FIG. 2A but illustrates only the body of the lever-activated lock.

The lock 10 includes a locking mechanism for selectively constricting the collar 50 about the pole section P2 to prevent sliding movement of the pole section P2 relative to the collar. In the illustrated embodiment, the ears 62a,62b define respective aligned unthreaded apertures 64a,64b. A fastener such as a screw 80 is inserted into and through theses aligned apertures so that the screw head 82 abuts the ear 62a and so that the threaded distal end 84 of the screw 80 projects through the ear 62b. With brief reference to FIG. 3, it is most preferred that the screw 80 be conformed as shown to have a proximal portion 86 adjacent the head 82 that is purely cylindrical and unthreaded. This proximal screw portion 86 and the aperture 64a defined in the ear 62a are dimensioned relative to each other so that the proximal screw portion 86 is received in the aperture 64a with a tight friction fit sufficient to prevent rotation of the screw 80 by means other than a tool acting on the head 82. Thus, once the screw 80 is operatively installed in the lock 10 as shown, it is rotationally fixed in position unless manually rotated by a user with a screwdriver acting on the screw head 82. Both apertures 64a,64b are unthreaded. With particular reference again to FIG. 3, it is most preferred that the distal end 84 of the screw 80 be threaded with a double-lead (two threads that start at two diametrically opposed positions on the distal screw end 84), left-handed thread for reasons that will become apparent to those of ordinary skill in the art upon reading further.

The lock 10 comprises a control member such as a lever 90. The lever includes a head 92 and a shank 94. The shank 94 is preferably defined as a wide, flat tab adapted for receipt of manual force thereon. The head 92 includes a threaded aperture 96 defined therethrough. The threaded aperture 96 is adapted for coacting with the threaded distal end 84 of the fastener 80. To assemble the lock 10, the screw 80 is first pushed fully into the aligned apertures 64a,64b until the screw head 82 abuts or nearly abuts the ear 62a. The screw 80 is then rotated with a tool acting on the screw head 82 to advance the head 92 of the lever 90 onto the distal end 84 of the screw until the lever 90 abuts the ear 62b. Of course, the lever 90 can be replaced by a thumb-screw or any other suitable control member that mates with the end 84 of the fastener 80 without departing from the overall scope and intent of the present invention.

Once the lock 10 is assembled as described, the screw 80 is frictionally fixed against further rotation owing to the friction fit of the proximal screw portion 86 in the aperture 64a of the ear 62a. In particular, the lever 90 is rotatably moveable on the screw 80 without causing rotation of the screw. Of course, other suitable means can be used to fix the screw 80 against unintended rotation without departing from the overall scope and intent of the present invention.

During the assembly process, the lever 90 is advanced onto the screw 80 a sufficient amount by rotation of the screw 80 so that when assembly is complete, movement of the lever 90 to a first (unlocked) position (shown at 90-1 in FIG. 4) causes the lever 90 to be retracted on the screw 80 so that the collar halves 60a,60b move apart due to their natural resilience a sufficient amount so that the pole P2 is able to slide freely relative to the collar 50. Furthermore, when the lever 90 is moved from the first position 90-1 to a second (neutral) position 90-2, it is preferred that the pole P2 still be movable axially and rotationally relative to the collar 50. On the other hand, movement of the lever 90 from the neutral position 90-2 to a third (locked) position (shown at 90-3 in FIG. 4) causes the lever 90 to be advanced on the screw 80 a sufficient amount so that the lever 90 bears against the ear 62b and so that the screw head 82 bears against the ear 62a whereby the ears 62a,62b move toward each other a sufficient distance to constrict the collar 50 and prevent sliding and/or rotational movement of the pole section P2 relative to the collar 50. A user can use a screwdriver or like tool to rotate the screw 80 periodically to adjust the position of the lever 90 on the screw 80 so that the first, second and third lever positions are properly defined even after repetitive movement of the lever 90 between the first, second and third positions. It is most preferred that the lever 90 abut the body 20 when moved from the neutral position 90-2 to the locked position 90-3 to prevent over-tightening of the collar 50 about the pole section P2.

The preferred double-lead thread on the screw 80 provides for maximum axial displacement of the lever 90 on the screw 80 when the lever 90 is rotated between its first, second and third operative positions. The left-hand thread allows for proper orientation of the lever relative to the poles P1,P2 and proper orientation of the first and second positions. Of course, the invention is not to be construed as limited to use of a left-hand and/or a double-lead screw 80.

The invention has been described with reference to preferred embodiments. Modifications will occur to those of ordinary skill in the art to which the invention pertains upon reading this specification. It is intended that the following claims be construed as encompassing all such modifications.

Having described the preferred embodiments, what is claimed is:

1. A lock for temporarily fixedly securing first and second associated pole sections in a telescoped arrangement, said lock comprising:

a base defining an axially extending through-bore adapted for close sliding receipt of an end portion of the first associated pole section;

a neck projecting from said base;

a collar connected to said neck and radially constrictable relative to said base, said collar defining an opening aligned with said axially extending through-bore of said base, said collar adapted for close sliding receipt of the second associated pole section partially telescoped into said first associated pole section, wherein said collar is defined by first and second collar portions connected to said neck and terminating in respective first and second ears arranged in spaced-apart relation to each other, said ears defining respective first and second bores;

a fastener extending through said first and second bores between said first and second ears, said fastener including a head abutting said first ear, an unthreaded first portion frictionally engaged with a portion of said first ear that defines said first bore to inhibit unintentional rotation of said fastener and a threaded distal end extending through said second bore defined in said second ear and projecting outwardly from said second ear;

a lever having a head defining a threaded aperture that is threadably engaged with said threaded distal end of said fastener, said lever movable rotatably relative to said threaded distal end of said fastener between an unlocked position in which said collar slidably receives and accommodates the second associated pole section, and a locked position in which said head of said lever is advanced on said threaded distal end of said fastener toward said head of said fastener and urges said second ear toward said first ear to constrict said collar radially relative to said base into frictional gripping engagement with the second associated pole section received in the collar, wherein said first portion of said fastener defines an unthreaded cylindrical conformation that is located in said first bore defined by said first ear with a tight frictional fit sufficient to restrain said fastener against rotation in response to movement of said lever between said unlocked and said locked positions, wherein said fastener is selectively rotatable via application of torque to said head sufficient to overcome said tight frictional fit between said unthreaded cylindrical conformation and said first ear.

2. The lock as set forth in claim 1, wherein each of said first and second collar portions are spaced axially from said base.

3. The lock as set forth in claim 1, wherein said base, said neck and said collar are defined as a one-piece molded plastic construction.

4. The lock as set forth in claim 1, wherein said axially extending through-bore defines first and second cylindrical portions, said second cylindrical portion having a smaller diameter than said first cylindrical portion and located axially between said first portion and said neck.

5. The lock as set forth in claim 1, wherein said threaded distal end of said fastener defines a double lead left-handed thread.

6. A telescoping pole apparatus comprising:

a first pole section defining a first bore;

a second pole section slidably located in said first bore of said first pole section in a telescoping arrangement;

a lock connected to said first pole section and adapted to secure said second pole section axially relative to said first pole section, said lock comprising:

a base defining an axial through-bore, wherein an end portion of said first pole section is located in said axial through-bore;

a collar connected to said base and selectively radially constrictable relative to said base, said collar defining an opening aligned with said axial through-bore, said second pole section projecting from said first bore of said first pole section and through said opening of said collar, said collar, when radially constricted relative to said base, firmly engaging and retaining said second pole section in an axially and rotatably fixed position relative to said first pole section;

a fastener connected to and frictionally engaged with said collar so as to be restrained against unintended rotation relative to said collar, said fastener comprising a head at a first end and a threaded second end that projects outwardly from said collar; and a control member that mates threadably with said threaded end of said fastener, said control member selectively manually rotatable relative to said fastener in first and second directions to constrict and expand said collar radially, respectively, said fastener restrained against rotation with said control member by frictional engagement between said fastener and said collar, wherein said fastener is selectively rotatable upon application of torque to said head sufficient to overcome said frictional engagement between fastener and said collar.

7. The telescoping pole apparatus as set forth in claim 6, wherein said control member comprises a lever including:

(i) a head defining a threaded aperture that receives said threaded end of said fastener; and (ii) a shank extending from said head and defining a wide flat tab.

8. The telescoping pole apparatus as set forth in claim 6, further comprising:

a neck projecting outwardly from said base, wherein said collar is connected to said neck and axially spaced from said base.

9. The telescoping pole apparatus as set forth in claim 8, wherein said collar comprises first and second collar portions that are connected to and project outwardly from said neck, said first and second collar portions terminating in respective first and second terminal ends that are spaced apart from each other and defined therebetween a gap in said collar.

10. The telescoping pole apparatus as set forth in claim 9, wherein said first and second terminal ends of said first and second collar portions define respective first and second apertures aligned with each other, wherein said fastener extends through aligned first and second apertures.

11. The telescoping pole apparatus as set forth in claim 10, wherein said fastener comprises a head opposite said threaded end and a portion adjacent said head that frictionally engages said first terminal end of said first collar portion whereby said fastener is held against unintended rotation relative to said first and second collar portions upon rotation of said control member relative to said fastener.

12. The telescoping pole apparatus as set forth in claim 11, wherein said threaded end of said fastener defines a double lead, left-handed thread.

13. The telescoping pole apparatus as set forth in claim 6, wherein said base and collar are defined as a one-piece molded plastic construction.

14. A lock apparatus for fixedly securing first and second pole sections in a telescoped relationship relative to each other, said apparatus comprising:

a first portion adapted for connection to an end portion of the first pole section;

a second portion connected to said first portion and defining a collar that is selectively radially constrictable relative to said first portion and adapted for receipt of the second pole section partially telescoped into the first pole section, said collar, when radially constricted, firmly engaging and fixedly retaining the second pole section received thereby, said collar comprising first and second ears separated from each other by a space;

a screw extending through said first and second ears of said collar and including a headed end and an opposite threaded end, said screw comprising an unthreaded cylindrical portion that is tightly frictionally engaged with only one of said first and second ears, said screw selectively manually rotatable relative to said first and second ears upon application of sufficient torque to said headed end to overcome said frictional engagement between said cylindrical portion of said screw and said one of said first and second ears; and a lever operably coupled to said threaded end of said screw and adapted for rotation in a first direction on said screw causing said lever to be advanced on said screw towards said headed end so that said collar is radially constricted, and adapted for rotation in a second direction opposite said first direction so that said lever moves away from said headed end of said screw and said collar resiliently radially expands, wherein said tight frictional engagement between said unthreaded portion of said screw and said one of said first and second ears restrains said screw against unintended rotation with said lever when said lever is moved in said first and second directions.

* * * * *